(No Model.)
P. LORD.
UNIVERSAL JOINT.
No. 276,186. Patented Apr. 24, 1883.
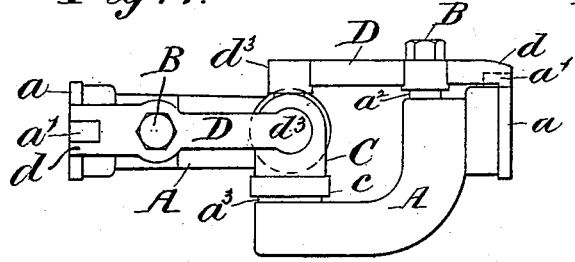
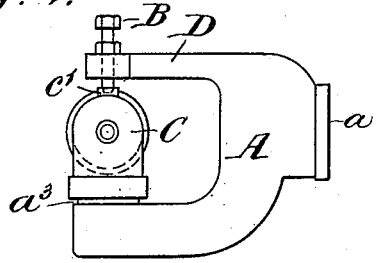
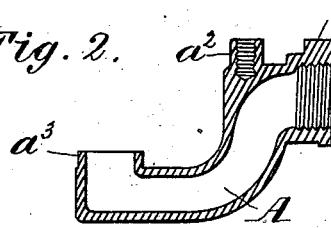
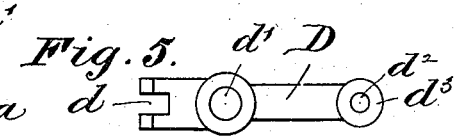
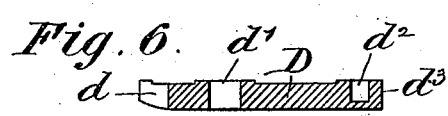
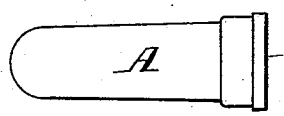
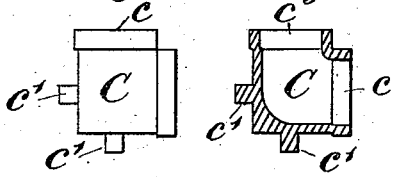
Witnesses
H. Irwin.
A. Thomas
Inventor
Peter Lord
By his attorney
Charles G. J. Simpson

UNITED STATES PATENT OFFICE.

PETER LORD, OF MONTREAL, QUEBEC, CANADA, ASSIGNOR OF TWO-THIRDS TO JEAN BAPTISTE VINET AND AVILA SERAPHIN VINET, BOTH OF SAME PLACE.

UNIVERSAL JOINT.

SPECIFICATION forming part of Letters Patent No. 276,186, dated April 24, 1883.

Application filed January 4, 1883. (No model.)

*To all whom it may concern:*

Be it known that I, PETER LORD, of the city of Montreal, District of Montreal, Province of Quebec, Canada, have invented new and useful Improvements in Universal Joints; and I do hereby declare that the following is a full, clear, and exact description of the same.

This invention has reference to a new form of universal joint for pipes employed in the transmission of liquids, air, gas, or steam, and like fluids, and may be found particularly useful for railway-car air or steam brakes, rock-drills, &c.

In the drawings hereunto annexed similar letters of reference indicate like parts; and Figure 1 is a view of the invention. Fig. 2 is a section of connecting branch. Fig. 3 is a back view of connecting branch. Fig. 4 is a modification of the invention. Fig. 5 is a plan of spring-bar reversed. Fig. 6 is a longitudinal section of spring-bar. Fig. 7 is an elevation of elbow. Fig. 8 is a section of Fig. 7 or elbow.

Letters A are the connecting branches, each of which consists of a hollow case, A, of the general configuration shown, having a socket, $a$, at one end, made in one therewith, said socket being screwed or flanged, as required, to agree with the end of the pipe to which it is to be attached. As shown in Fig. 1, the socket $a$ is provided with a projection, $a'$.

$a^2$ is a projection formed on A, in which a hole is bored and screwed to receive the screwed end of a bolt, B.

$a^3$ is a circular flange or projection formed on the end of A. The outer side of this flange is turned or otherwise trued up to enter within the end $c$ of an elbow, C. The projections $a^3$, and the bored-out end $c$ of the elbow into which it enters, are both slightly tapered. They are "ground" together or otherwise fitted to be fluid-tight while turning upon each other. As the elbow has two ends, there will be two connecting branches provided—one to each end $c$—and to keep the projections $a^3$ in proper contact with the elbow, each connecting branch is provided with a spring-bar, D. The elbow is provided with two pivots or projections, $c'$, each (see Figs. 6 and 7) set opposite to and concentric with the bore of the ends $c$ of the elbow. The spring-bars D each consist of a bar having a forked end, $d$, embracing the projection $a'$, an opening, $d'$, fitting closely but easily upon the projection $a^2$, and a recess, $d^2$, in its end $d^3$, to fit the pivot projection $c'$. By placing the bar D in position as shown in Fig. 1 and inserting the screw B into the projection $a^2$, the bar D is tightened up by the screw to hold the parts in contact not only against what strains the joint or invention may be subjected to, but also against the pressure of the fluid passing through the parts.

As another modification of and equivalent to the above-described invention, Fig. 4 is given. Here the spring-bar D is made in one with the connecting branch A, and the screw B is screwed into the end of D, the end of the screw being received within a recess formed for it in pivot projection $c'$. In constructing the invention in this modification there must be enough space between A (having projection $a^3$) and D to get the elbow C into its place.

Although but one connecting branch is shown in Fig. 4, it will be understood that two will be required, the same as two are shown in Fig. 1.

What I claim as my invention, and wish to secure by Letters Patent, is as follows:

The combination of the elbow C, connecting branches A, spring-bars D, pivot-connection, and tightening-screw, all constructed, arranged, and operating substantially as and for the purposes set forth.

PETER LORD.

Witnesses:
    CHARLES G. C. SIMPSON,
    A. A. SIMPSON.